United States Patent [19]

Handen et al.

[11] 3,892,107
[45] July 1, 1975

[54] DEVICE FOR TRANSFERRING TORQUE FROM A DRILL-SLEEVE TO A DRILL-TOOL

[75] Inventors: Ebbe Sigfrid Adolfsson Handen; Carl Gosta Bernhard Ekwall, both of Saltsjobaden, Sweden

[73] Assignee: Atlas Copco Aktiebolag, Stockholm, Sweden

[22] Filed: July 2, 1973

[21] Appl. No.: 375,351

[30] Foreign Application Priority Data
July 7, 1972  Sweden.............................. 9063/72

[52] U.S. Cl. .......................... 64/23; 64/6; 403/359; 403/383; 173/104
[51] Int. Cl. ............................................. F16d 3/06
[58] Field of Search................. 64/23, 23.5, 6, 27 R; 403/383, 359; 173/104, 105

[56] References Cited
UNITED STATES PATENTS

| | | |
|---|---|---|
| 1,912,412 | 6/1933 | Stubbs .................................... 64/23 |
| 3,073,134 | 1/1963 | Mann ....................................... 64/23 |
| 3,517,754 | 6/1970 | Hughes ................................. 64/27 R |
| 3,618,340 | 11/1971 | Geisthoff et al. ........................ 64/23 |

*Primary Examiner*—Benjamin W. Wyche
*Assistant Examiner*—Randall Heald
*Attorney, Agent, or Firm*—Eric Y. Munson

[57] ABSTRACT

Coupling means for transferring the torque from a drill sleeve which rotates in the housing of a rock drilling machine to the drill tool. The drill sleeve has a circular exterior toothed surface which meshes with a driven gear wheel and a non-circular interior surface which engages a corresponding exterior surface of an intermediate sleeve. The intermediate sleeve is loosely fitted telescopically within the drill sleeve to permit removal therefrom without using any substantial force but is restrained from any substantial axial movement therein. The intermediate sleeve also has an interior non-circular surface which freely engages a correspondingly non-circular portion of the drill tool, which is reciprocated within the intermediate sleeve by percussive impacts.

2 Claims, 2 Drawing Figures

DEVICE FOR TRANSFERRING TORQUE FROM A DRILL-SLEEVE TO A DRILL-TOOL

BACKGROUND OF THE INVENTION

The present invention relates to a device for transferring torque from a drill-sleeve to a shank adapter or a drill-rod which is axially movable in the drill-sleeve.

In known rock-drilling machines the torque is usually transferred directly from the drill-sleeve to the drill-tool. The drill-tool may have a hexagonal shank or a shank having splines. In so-called extension rod drilling the drill-tool is at its rear end provided with a shank adapter. The drill-sleeve is internally provided with a hexagonal hole or with grooves for cooperation with the drill-tool and furthermore provided with teeth or jaws for transmitting the torque to the drill-sleeve. During drilling, the drill-tool is subjected to impacts which cause it to move axially in the drill-sleeve. This axial movement causes wear which reduces the service life of the drill-sleeve. Since the drillsleeve has a complicated form it is expensive to manufacture. This means that a replacement of the drill-sleeve is comparatively expensive. Furthermore, in known machines replacement of the drill-sleeve is quite time consuming. In another known design the drill-sleeve is provided with a circular hole into which a separate sleeve has been pressed. This sleeve latter is externally circular and internally provided with a hexagonal hole. In this design the torque is transferred by friction and therefore very large pressure forces are required. In order to press out a worn-out sleeve from the drill-sleeve assembly a pressure force of 5 to 10 tons is required. This means in practice that the entire drill-sleeve assembly has to be removed. The drill-sleeve assembly is thereafter mounted in a heavy press for pressing out the separate sleeve.

SUMMARY OF THE INVENTION

It is therefore the principal object of the present invention eliminate the above mentioned disadvantages. This is achieved by means of a device which has the characteristics defined in the appended claims. By reason of the fact that the intermediate sleeve is loosely fitted within the drill-sleeve, it can easily be replaced at the working location by hand or by means of simple tools, e.g., a screwdriver.

According to a preferred embodiment of the invention the intermediate sleeve has an annular cross-sectional area the inner and outer contour of which each defines a tri-sectional epitrochoid. By reason of this feature the following advantages are achieved: very good moment transferring capacity, very good centering of the drill-tool, low surface pressure between the drill-tool and the intermediate sleeve and between the drill-sleeve and the intermediate sleeve which makes lubrication of these parts easier. Furthermore the low surface pressure makes it possible to manufacture the intermediate sleeve from a material with good bearing characteristics e.g. a phosphor bronze or lead bronze. The intermediate sleeve can easily and inexpensively be manufactured by drawing a tube to the final cross-sectional form which thereafter is cut into suitable lengths.

BRIEF DESCRIPTION OF THE DRAWING

An embodiment of the invention is described below with reference to the accompanying drawing on which

Figure 2:
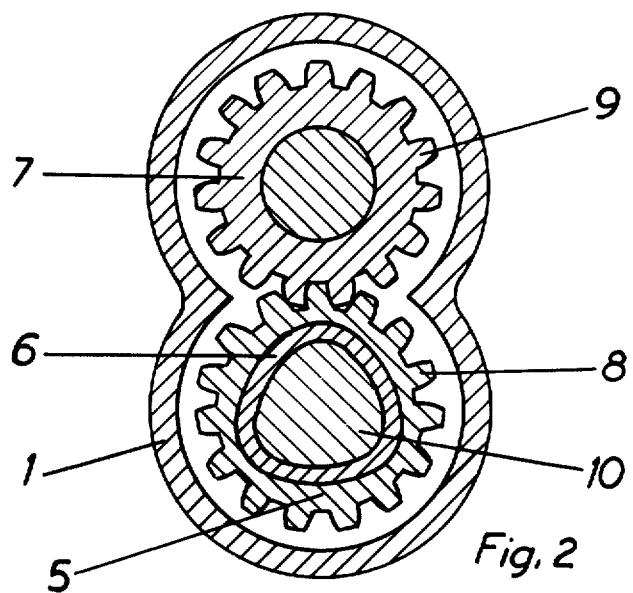
FIG. 2 shows a section according to 2—2 in FIG. 1.
Figure 1:
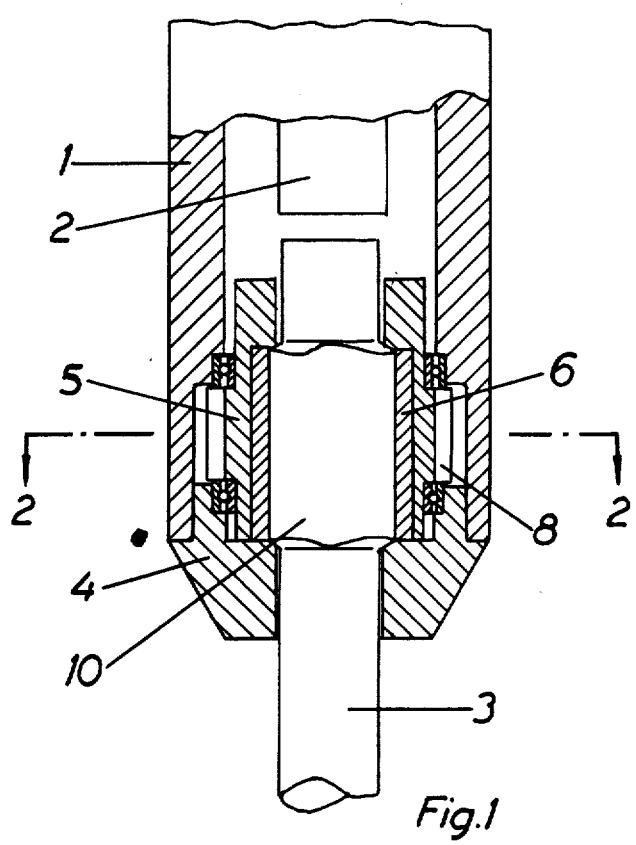
FIG. 1 shows a schematized rock-drilling machine partly in section.

The drilling machine comprises a housing 1. In the housing 1 a hammer mechanism is arranged of which only the front part of the hammer piston 2 is shown. The hammer piston 2 is mounted to deliver percussion impacts upon the drill-tool 3. The drill-tool 3 can be either a drill-rod or a drill-string which at its rear end is provided with a shank adapter. The drill-tool 3 is at its rear end provided with a driving rod or adapter 10 which is made as a tri-sectional epitrochoid which at its end portions has a somewhat lesser radial extension in order to avoid edge pressures. The member 10 can have any suitable length. When a shank adapter is used it can at its front end be provided with any suitable thread which can be external or internal. Furthermore, the drill-tool 3 can be made either for central flushing or for separate flushing. The drill-tool 3 is by means of the driving rod 10 supported for axial movement by an intermediate sleeve 6. The intermediate sleeve 6 is loosely supported by the toothed drill-sleeve 5. The intermediate sleeve 6 is locked against axial movement by the housing 1 and a retainer member 4 which is mounted on the machine housing 1 in a suitable manner. The drill-sleeve 5 receives torque from the toothed wheel 7 by means of the teeth 8, which mesh with the teeth 9. The toothed wheel 7 is driven by a separate rotation motor or from a ratchet and pawl mechanism forming part of the rock-drilling machine.

It should be apparent from the above disclosure that axial movement of the rod 10 may be provided by means of a recess in the cap 4 or some similar conventional arrangement.

What we claim is:

1. A coupling for transferring the torque to a drill tool which is reciprocated by percussive impacts in the housing of a rock drilling machine, comprising;
   a. a drill sleeve mounted to rotate within the housing while being restricted against axial movement therein;
   b. said drill sleeve having an exterior circular toothed surface meshing with a driven gear wheel;
   c. an intermediate sleeve loosely fitted telescopically in an interior recess in said drill sleeve to permit substantially non-forcible removal therefrom while being restrained from any substantial axial movement therein;
   d. the exterior surface of said intermediate sleeve and the facing surface of said recess having substantially corresponding non-circular contours to provide driving engagement therebetween;
   e. said intermediate sleeve having an interior surface of non-circular contour telescopically engaging a substantially correspondingly contoured portion of the drill tool to transfer the torque thereto while permitting axial reciprocation within the confines thereof;
   f. said intermediate sleeve being restrained against axial movement by a shoulder defining the upper limit of said recess and by a removable cap member on the housing defining the lower limit of said recess.

2. A coupling according to claim 1, in which the contours of the interengaging surfaces of said drill sleeve, said intermediate sleeve and said drill tool portion define a trisectional epitrochoid.

* * * * *

UNITED STATES PATENT OFFICE
CERTIFICATE OF CORRECTION

Patent No. 3,892,107　　　　　　　　　　　Dated　July 1, 1975

Inventor(s) Ebbe Sigfrid Adolfsson (Handen) and Carl Gosta Bernhard Ekwall

It is certified that error appears in the above-identified patent and that said Letters Patent are hereby corrected as shown below:

Name of Inventors: Ebbe Sigfrid Adolfsson and Carl Gosta Bernhard Ekwall

Signed and Sealed this twenty-third Day of December 1975

[SEAL]

Attest:

RUTH C. MASON　　　　　　　　C. MARSHALL DANN
*Attesting Officer*　　　　　　*Commissioner of Patents and Trademarks*